(12) United States Patent  
Aguro

(10) Patent No.: US 6,915,247 B1  
(45) Date of Patent: Jul. 5, 2005

(54) COMPUTER SYSTEM

(75) Inventor: Seiki Aguro, Kobe (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/281,042

(22) Filed: Mar. 30, 1999

(30) Foreign Application Priority Data

Mar. 31, 1998 (JP) .......................................... 10/103532

(51) Int. Cl.[7] .......................... G06F 11/30; G06F 17/50; G06G 7/48
(52) U.S. Cl. ............... 703/6; 716/1; 713/189
(58) Field of Search ................ 703/6; 716/1; 713/189

(56) References Cited

U.S. PATENT DOCUMENTS

| | | | | |
|---|---|---|---|---|
| 4,139,864 A | * | 2/1979 | Schulman | 348/5.5 |
| 4,603,381 A | * | 7/1986 | Guttag | 713/190 |
| 4,700,296 A | * | 10/1987 | Palmer et al. | 705/32 |
| 4,766,516 A | * | 7/1988 | Ozdemir et al. | 361/820 |
| 4,942,516 A | * | 7/1990 | Hyatt | 712/32 |
| 5,357,572 A | * | 10/1994 | Bianco et al. | 713/193 |
| 5,774,545 A | * | 6/1998 | Raghavachari | 713/189 |
| 5,784,577 A | * | 7/1998 | Jacobson et al. | 710/104 |
| 5,805,607 A | * | 9/1998 | Khu | 714/726 |
| 5,838,901 A | * | 11/1998 | Curd et al. | 710/104 |
| 5,960,084 A | * | 9/1999 | Angelo | 713/185 |

OTHER PUBLICATIONS

IEEE Standard Test Access Port and Boundary–Scan Architecture; IEEE Std 1149.1–1990; 138 pages, May 1990.*

Texas Instruments, XDS51x Emulator Installation Guide, Microprocessor Development Systems, 1996, D411002–9741 revision A, SPNU070A, Printed in U.S.A., Jan. 1996.

Texas Instruments, IEEE Std 1149.1 (JTAG) Testability Primer, Semiconductor Group, SSYA002C, 1996.

* cited by examiner

*Primary Examiner*—Hugh Jones

(74) *Attorney, Agent, or Firm*—William B. Kempler; W. James Brady, III; Frederick J. Telecky, Jr.

(57) ABSTRACT

The objective of the invention is to be able to switch between execution and cancellation of copy protection at any time in a simplified structure. The switching circuit 24 is provided within the gate array unit 16 in the signal path between the scan-path interface circuit 18 and the terminal pin for the emulation. The DSP 10 accesses the switching circuit 24 through the internal bus, logic interface circuit 26, and the logic bus, and can write the intended switch control information to the register within the switching circuit 24. The switching circuit 24 selectively switches the signal path between the interrupted state and the conductive state according to the switch control information given by the DSP 10, and selectively switches the scan-path interface circuit 18 between the enabled state and the disabled state.

18 Claims, 2 Drawing Sheets

COMPUTER SYSTEM

FIELD OF THE INVENTION

This invention concerns a one-chip type computer system equipped with a memory information copy preventing function.

BACKGROUND OF THE INVENTION

Generally, in a one-chip type computer system, such as a microcomputer, for example, software is tested and debugged and the operation of the hardware is checked by an in-circuit emulator.

In this type of emulation, the program (target program) is executed by a computer system which becomes the target of the emulation, which is the target system, the pattern of optional execution information is detected by the tracing function during that execution, the target program is interrupted at an intended break point by the breaking function in order to check the state of each part within the system, and the software and hardware of the target system are checked and debugged.

In many emulators of this type, the memory contents of the major memories and registers within the target system are read out by the scan-path method.

The scan-path method will be explained with FIG. 4. In FIG. 4, the target system 100 is a microprocessor or a DSP (digital signal processor), for example, and various kinds of registers are distributed in each part and arranged within. Among these various kinds of registers, registers that make up the major part of the system, such as registers for the address system and registers for the control system, for example, and registers for the data system, such as an accumulator register and a memory I/O register, for example, that specify the register names by commands from the program and write data to or read data from these (I/O registers), are integrated into a scan-path 1.

Each of the registers that are integrated into the scan-path is structured to input and output data in parallel in normal mode and input and output data serially in the scan-path mode.

Generally, one scan-path is provided within one computer system, and a number of registers are serially connected in this scan-path. For example, in the target system 100 in FIG. 4, 7 registers RA1, RA2, RB1, RB2, RB3, RC1, and RC2 are serially connected in the scan-path (1). These registers RA1, RA2, RB1, RB2, RB3, RC1, and RC2 are accessed in parallel in normal operations, and all of these are serially accessed when the scan-path is used. Both ends of this scan-path 1 are connected to the emulator 110 through multiplexers 102 and 104 and data input and output terminals 106 and 108.

Also in FIG. 4, the register bypass is a register that is used when bypass is performed without using the scan-path in the emulation mode. A number of ICs are mounted on the same printed substrate, and when one IC is debugged by the scan-path, other IC's bypass signals via the aforementioned register bypass. Both ends of this bypass 2 are connected to the emulator 110 through multiplexers 102 and 104 and data input and output terminals 106 and 108.

Also in FIG. 4, registers RI1 and RI2 are command registers, and commands for switching the multiplexers 102 and 104 and for switching each mode are set. Also, these registers RI1 and RI2 include a command decoder.

When the program of the target system 100 is stopped at a prescribed break point in the emulation, the information indicating the system state at that point is held at each of the registers RA1, RA2, RB1, RB2, RB3, RC1, and RC2.

The emulator 110 switches the multiplexers 102 and 104 and selects the scan-path 1, supplies a prescribed clock [signal] to each register on this scan-path 1, and serially moves the contents of each register on the scan-path 1 and sequentially reads them out to the outside of the target system 100 and takes them in.

Because the emulator 110 knows beforehand what register is positioned in what order on each scan-path, for each register it can separate a series of serial data taken in from the scan-path 1 and recognizes the contents (information) of each register.

By the aforementioned emulation by the scan-path method, stored information within the system, particularly programs and other data stored within a mask ROM (read-only memory) built within the system can be easily read out from outside the system even with one-chip type computer systems that do not have the program bus pin. In other words, it is easy to copy all memory information within ROM.

In this way, the danger of the ROM information of the system being illegally copied remains because of the scan-path function.

When the secrecy of the ROM information had to be maintained in a computer system of this type, the signal path for connecting the interface circuit within the system relative to the emulation and the external emulation was interrupted by the hardware, and signals could not be exchanged between them.

However, in this method, the signal path was completely interrupted once copy protection was applied, and there was the inconvenience that debugging and testing afterwards could not be performed at all.

The aim of this invention, which was made while considering said problem, is to offer a computer system in which execution or cancellation of copy protection can be switched at any time in a simplified structure.

Also, another aim of this invention is to offer a computer system that has a copy protection function with a high level of security and flexibility.

SUMMARY OF THE INVENTION

In attaining the aforementioned aims, the first aspect of a computer system of this invention, which is a computer system in which a processor, memory, peripheral circuits, and interconnecting wires are formed together over one semiconductor substrate, has a structure equipped with: a scan-path interface circuit, which allows for a readout of the storage contents of a prescribed memory or a register within the system through the aforementioned processor by the scan-path method; a switching circuit, which can be accessed by the aforementioned processor, and selectively switches the aforementioned scan-path interface circuit between the enabled state and the disabled state according to the prescribed switch control information given by the aforementioned processor; and a program storage means, which stores the program for the aforementioned processor to enable processing to give the aforementioned switch control information to the aforementioned switching circuit.

Also, a second aspect of a computer system of this invention in the aforementioned first computer system has a structure in which the aforementioned switching circuit has: a register for holding the aforementioned switch control information which can be accessed by the aforementioned processor; and a gate circuit, which is provided over a signal path that is connected to the aforementioned scan-path interface circuit and has an open state or a closed state according to the contents of the aforementioned register.

A third aspect of a computer system in this invention in the aforementioned first computer system has a structure in which the aforementioned switching circuit has: a number of password registers for holding the aforementioned switch control information which can be individually accessed by the aforementioned processor; a comparison means, which compares the contents of the number of aforementioned password registers with each other and yields comparison results; and a gate circuit, which is provided over the signal path which is connected to the aforementioned scan-path interface circuit, and which has an open state or a closed state according to the comparison results from the aforementioned comparison means.

In the figures, 10 represents DSP, 12 ROM, 14 RAM, 16 gate array unit, 18 scan-path interface circuit, 20 host interface circuit, 24 switching circuit, 30, 32 password registers, 34 comparator, 36 gate circuit, and 38 register.

DESCRIPTION OF EMBODIMENTS

An embodiment of this invention will be explained by referring to FIGS. 1–3 below.

Figure 1:
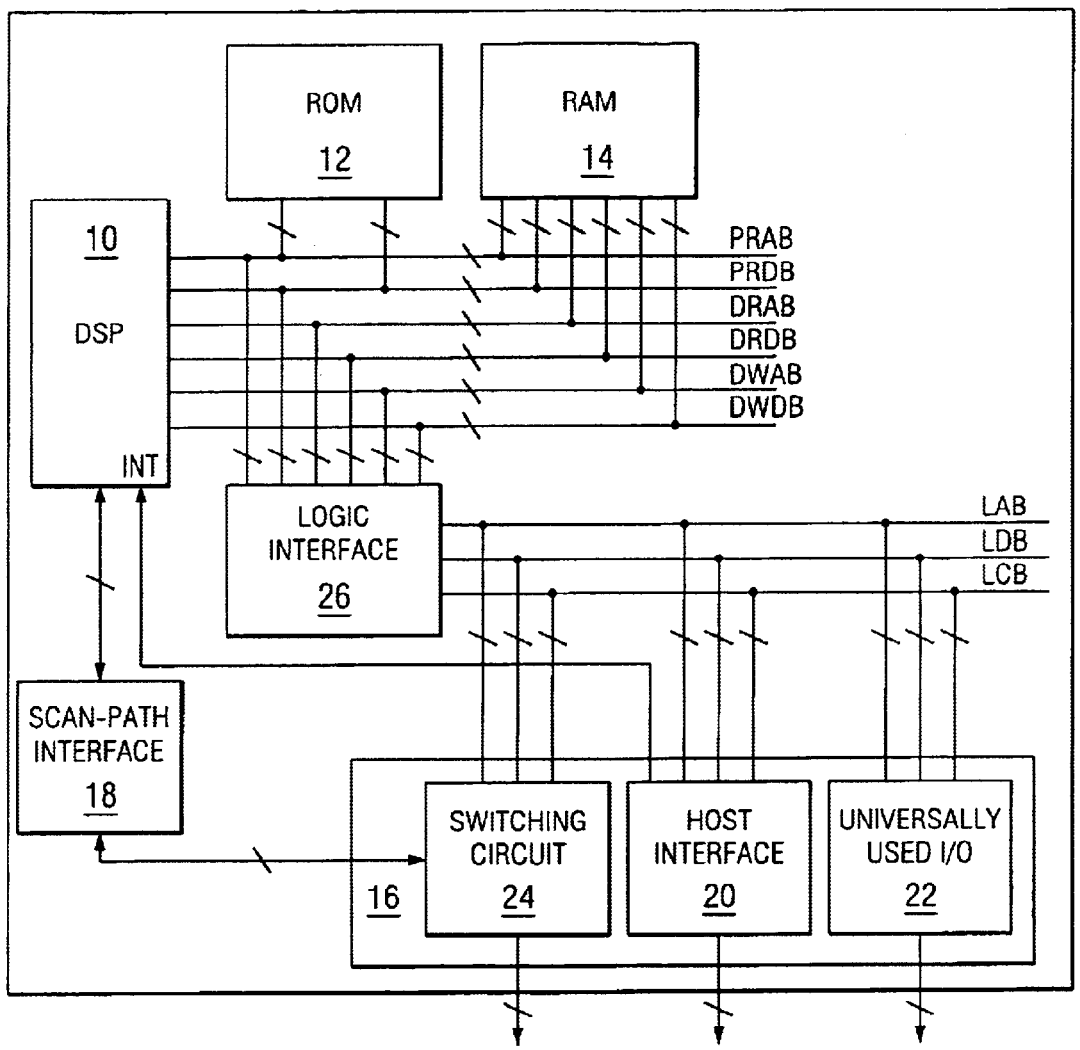
FIG. 1 is a block diagram showing the chief components of the computer system in an embodiment of this invention.

FIG. 1 shows the chief components of a computer system in an embodiment of this invention. This computer system is a one-chip type microcomputer, in which a processor, memory, peripheral circuits, and interconnecting wires are formed together over one semiconductor substrate.

In this system, the processor consists of a universally used DSP 10, the memory consists of a mask ROM 12 and an internal RAM (random-access memory) 14, and peripheral circuits consist of a gate array unit 16 and a host interface circuit 18, for example. The gate array unit 16 includes: a host interface circuit 20; a universally used interface circuit 22; a switching circuit 24; and other various kinds of custom logic circuits (not shown in the drawing).

The ROM 12 stores programs that specify the processing operations of the DSP 10, various kinds of settings data and/or tables, for example. The program in relation to the copy protection (routine) by this embodiment, which will be described later, may be stored in the ROM 12. The DSP 10 and the ROM 12 are connected to each other through the program address bus PRAB and the program data bus PRDB.

The RAM 14 stores data in relation to arithmetic processing in the DSP 10, and also may store appropriate system programs or application programs in some cases. The DSP 10 and the RAM 12 are connected to each other through the program address bus PRAB, program data bus PRDB, data readout address bus DRAB, data readout data bus DRDB, data write address bus DWAB, and the data write data bus DWDB.

The host interface circuit 20 in the gate array unit 16 is an interface circuit for exchanging data and programs between this system and the host computer (not shown in the FIG.). The universally used interface circuit 22 is an interface circuit for exchanging data and programs between this system and outside circuits or the memory.

The switching circuit 24, which is provided within the gate array unit 16, is one component that makes up the copy protection function in this embodiment. The exact structure as well as the operation of this switching circuit 24 will be described later.

Each part within the gate array unit 16 is connected to the logic interface circuit 26 through external buses that include the logic address bus LAB, logic data bus LDB, and the logic control bus LCB. Then, the logic interface circuit 26 is connected to the DSP 10 through the aforementioned internal buses PRAB, PRDB, DRAB, DRDB, DWAB, and DWDB.

The logic interface circuit 26 is an interface circuit which connects each part within the gate array unit 16 to the DSP 10.

The scan-path interface circuit 18 is an interface circuit which implements the scan-path method of emulation in this system, and includes data transfer means, such as exclusive registers for the emulation and multiplexers, for example, and a controller, which controls these data transfer means according to the timing signal and control signal from the external emulator, for example.

Figure 2:
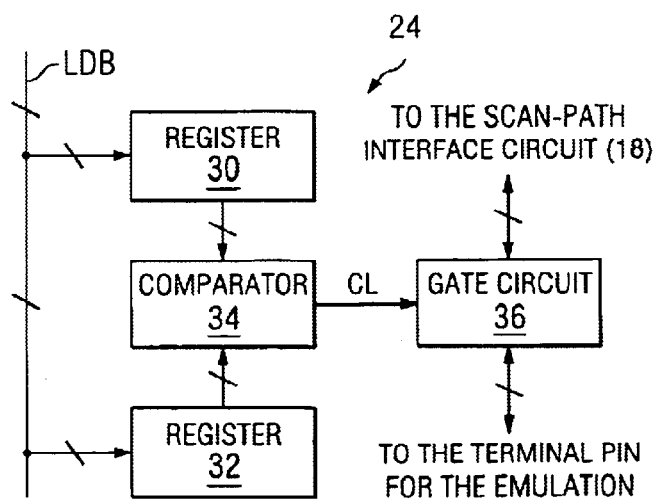
FIG. 2 is a circuit diagram showing a constitutional example of the switching circuit in the embodiment.
Figure 3:
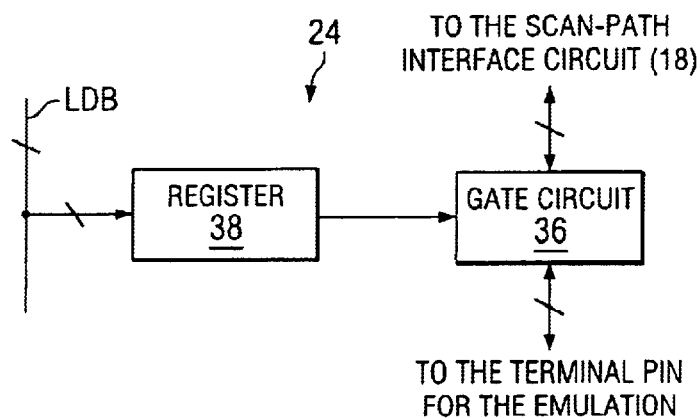
FIG. 3 is a circuit diagram showing a modified example of the switching circuit in the embodiment.
Figure 4:
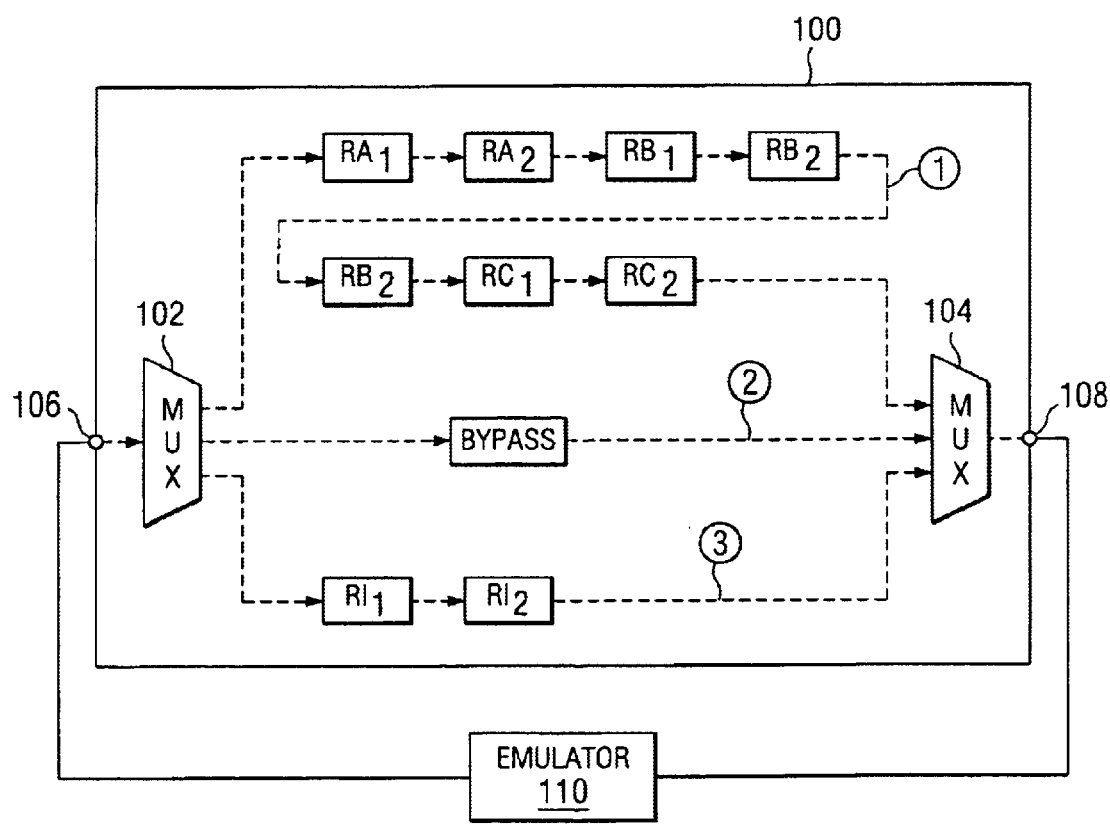
FIG. 4 is a diagram which explains the scan-path method.

FIG. 2 shows an example of the circuit structure of a major part of the switching circuit 24 in this embodiment.

This structural example consists of a pair of password registers 30 and 32 consisting, for example, of 16 bit parallel-in parallel-out type registers, comparator 34, and a gate circuit 36. The data input terminal of each of the password registers 30 and 32 is connected to the logic data bus LDB, and the data output terminal of each is connected to the input terminal of the comparator 34. The output terminal of the comparator 34 is connected to the control terminal of the gate circuit 36. The gate circuit 36 consists of a logic circuit, such as an AND gate, for example, and it is provided in the signal path between the scan-path interface circuit 18 and the terminal pin for the emulation (not shown in the figure).

Also, an address decoder circuit (not shown in the figure) as a write control means for writing data into the registers 30 and 32 is provided within the switching circuit 24. This address decoder circuit is connected to the logic address bus LAB and the logic control bus LCB.

Next, the function of the copy protection function in this embodiment will be explained.

When a reset signal enters the reset terminal of this system (chip), for example, the DSP 10 executes the necessary initialization processing according to the prescribed program stored in the ROM 12, and implements the copy protection routine below as one process.

First, the DSP 10 outputs the prescribed readout address via the data readout address bus DRAB, reads out the data of the prescribed password PW via the data readout data bus DRDB from the RAM 14, and takes in this password data PW, which was read out.

Successively, the DSP 10 respectively sends out the prescribed write address, which specifies the primary register 30 within the switching circuit 24, and said password data PW over the logic address bus LAB and the logic data bus LDB through the logic interface circuit 26. In this way, said password data PW is written to the primary password register 30 at the switching circuit 24.

The aforementioned password PW is the secret code known only to authorized individuals, such as the programmer, for example, and it is set to an optional number of characters within a prescribed range.

Next, the DSP 10 sends out the prescribed write address, which specifies the secondary password register 32 within the switching circuit 24, and optional data RW, which are different from said password data PW, respectively via the logic address bus LAB and the logic data bus LDB through the logic interface 26. In this way, said data RW are written to the secondary password register 32 at the switching circuit 24.

The comparator 34 compares the contents of both the password registers 30 and 32 (PW, RW) within the switching circuit 24, and gives the comparison result signal CL of the logic value L, for example, indicating that both do not match, to the gate circuit 36. In this way, the gate circuit 36 will be in an off or interrupted state, which disconnects the signal path between the scan-path interface circuit 18 and the terminal pin for emulation, and a disabled (operation is impossible) state is obtained.

Accordingly, even though the emulator is connected to this system, signals cannot be exchanged between the emulator and the scan-path interface circuit 18, and the execution of the emulation becomes impossible. In this way, the storage information within the system, the storage contents of the ROM 12 in particular, will be protected from illegal copying.

Only the scan-path interface circuit 18 does not function in such a copy protection [scheme], and all other resources and elements within the system can function normally. The DSP 10 in particular is not required to be involved with the scan-path interface circuit 18 and the switching circuit 24 when executing processing primarily for the system, and can function without any inconveniences.

To cancel the copy protection function of this system, a prescribed command is given to this system from an outside host computer, for example. When this command is input into the host interface circuit 20, an interrupt (Int) enters the DSP 10, and the DSP 10 executes the following process according to the prescribed copy protection canceling routine, which is stored in the ROM 12.

First, the DSP 10 receives the input command from the host interface circuit 20 through the logic address bus LAB, logic data bus LDB, logic interface circuit 26, data readout address bus DRAB, and the data readout data bus DRDB. This received input command is sequentially stored in the RAM 14 through the data write address bus DWAB and the data write data bus DWDB.

Next, the DSP 10 takes in said input command from the RAM 14 through the data readout address bus DRAB and the data readout data bus DRDB, and compares and refers this input command to the command table within the ROM 12 at the arithmetic circuit inside and decodes the input command.

When a decoding result is obtained that this input command is a copy protection canceling command, the DSP 10 takes in the password PW' for writing to the secondary password register 32 at the switching circuit 24 through the data readout address bus DRAB and the data readout data bus DRDB. This password PW' may be read out from the prescribed storage address in the RAM 14, or it may be the one given together with the canceling command from the host interface circuit 20. Either way, this password PW' also is a secret code known only by those involved with this system, and it is selected to be the same value as the password PW, which is held at the primary password register (30).

Next, the DSP (10) writes the password PW', which was taken in, to the secondary password register (32) at the switching circuit (24) during the same writing cycle as the aforementioned initialization.

Then, the comparison result signal CL of the logic value H, for example, indicating that the contents of both the password registers 30 and 32 (PW, PW') match, is obtained from the comparator 34 at the switching circuit 24, and the gate circuit 36 will have an on or conductive state according to this comparison result signal CL. In this way, the signal path between the scan-path interface circuit 18 and the terminal pin for emulation is made conductive, and an enabled (operation is possible) state is obtained.

Accordingly, as the emulator is connected to this system, signals can be exchanged between that emulator and the scan-path interface circuit 18, and the scan-path method of emulation can be implemented. Through this emulation, storage information from major memories and registers within this system can be read out and debugging, and testing can be performed, and it is also possible to dump the contents from the mask ROM 12.

As described above, in the computer system in this embodiment, the switching circuit 24, which selectively switches the scan-path interface circuit 18 between the enabled state and disabled state, is provided in the gate array unit 16, and the routine for the DSP 10 to access this switching circuit 24 and to write the switch control information (PW, RW, and PW') is pre-stored in the ROM 12.

During the normal state, the scan-path interface circuit 18 is in the disabled state when the prescribed switch control information (PW, RW) is written to the switching circuit 24 because of the copy protection routine at initialization, for example, execution of the emulation by the scan-path method is impossible, and there exists a state in which the information storage within the system, particularly the stored information of the ROM 12, cannot be copied. Also, different values can be forcibly set (through the hardware) respectively at the password registers 30 and 32 by resetting the system, and the scan-path interface circuit 18 can be in the disabled state.

Then, when it is necessary to execute the emulation in this system, for debugging, for example, a prescribed command is given by an external host controller, the copy protection canceling routine is executed within the system, the prescribed switch control information (PW, PW') is written to the switching circuit 24 and the scan-path interface circuit 18 then enters the enabled state, execution of the emulation by the scan-path method becomes possible, and the storage information within the system, particularly the storage contents of the ROM 12, can be read out.

After completion of the emulation, the DSP (10) executes the same aforementioned copy protection routine while responding to the reset signal from the host computer's side, for example, and copy protection is again applied.

In this manner, it is designed so that execution or cancellation of copy protection can be switched at any time in this embodiment, and maintenance of the secrecy of stored system information and repetition of debugging can be attained at the same time. Also, because execution and cancellation of copy protection is performed by software or programmed, management on the JC maker's part becomes unnecessary, and unrestricted management by the customer becomes possible.

Moreover, in this embodiment, the opening and closing state of the gate circuit 36 is controlled, and switching between execution and cancellation of copy protection is also controlled by the matching or not matching of the data (switch control information) written into the two password registers 30 and 32. By this method, the switch control information or the password can be freely set up and changed, and management of the password at a high level of security as well as flexibility can be attained.

In order to further increase the level of security, one or a number of dummy passwords may be sent with the original password, or a program may be made so that said password is scrambled in a prescribed way and sent, and the DSP 10 decodes it when sending the command and the password for cancellation of copy protection from the host computer.

In this embodiment, the hardware type switching circuit 24, which has a simple logic, is provided in the gate array unit 16, and an easy software type routine using a general write cycle and readout cycle by the processor is prepared. Therefore, the aforementioned copy protection function with a high level of security and flexibility is attained with minimal necessary resources without requiring special terminals and external circuits.

An ideal embodiment of this invention was explained above, but many modifications and alterations are possible within the range of the technological concept of this invention.

For example, various methods are possible for giving the instruction to switch between execution/cancellation of copy protection to this system from the outside. The command or password can be given from a universally used interface circuit 22 and other ports instead of via the host interface circuit 20.

It is also possible to provide more than 3 password registers at the switching circuit 24. Also, although the level of security and flexibility becomes significantly lower than that of the aforementioned embodiment, it is possible to have a structure with one register 38 and a gate circuit 36, one switch control information is written to the register 38, and switching between execution/cancellation of copy protection is controlled, as shown in FIG. 3.

The gate circuit 36 in the off state may practically shut off the signal path that is connected to the scan-path interface circuit 18, and it is not necessary to shut off all bits of said signal path. It is possible to have a structure which interrupts only the clock signal for the scan pass.

Also, in the aforementioned embodiment, the switching circuit 24 was provided in the signal path, which was connected to the scan-path interface circuit 18, but it is also possible to have a structure in which the switching circuit 24 directly or indirectly switches the scan-path interface circuit 18 without the inclusion of such a signal path.

In the aforementioned embodiment, the routine (program) relative to copy protection is stored in the ROM 12, but it may be stored in the RAM 14 or other storage means.

In the aforementioned embodiment, the switching circuit 24 was electrically provided between the scan-path interface circuit 18 and the terminal pin for emulation, but it is also possible to provide it at other locations, such as between the scan-path interface circuit 18 and the DSP 10.

Concerning the processor in the computer system in this invention, processing by optional methods besides the DSP are possible, and various kinds of modifications are possible to the memory and peripheral devices.

As explained above, in the computer system in this invention, the scan-path interface circuit is selectively switched between the enabled state and the disabled state by execution of the prescribed program by the processor and writing in the prescribed switch control information into the switching circuit. Therefore, execution or cancellation of copy protection can be switched any time in the simplified structure, and maintenance of secrecy of information stored within the system and repetition of debugging can be attained at the same time.

What is claimed is:

1. An integrated circuit computer system on a single integrated circuit comprising:
   a processor interconnected with memory and peripheral circuits on said integrated circuit;
   a scan-path interface circuit for reading out contents of a predetermined memory or register in said system;
   a switching circuit coupled to said processor and to said scan-path interface circuit for switching said scan-path interface circuit between a first mode in which it is enabled and a second mode in which it is disabled; and
   a security mechanism comprising:
   a plurality of input ports for said processor;
   a program stored in said memory to operate said processor to receive a plurality of commands applied to said plurality of input ports and to process said commands to produce a password which is compared with a predetermined password;
   and wherein said switching circuit is responsive to said comparison.

2. The computer system of claim 1 wherein said program operates said processor to receive said plurality of commands which are applied to said plurality of ports in a specific time sequence.

3. The computer system of claim 2 further comprising a pair of registers, one of said registers receiving said produced password and the other of said registers containing said predetermined password; and a comparator for comparing the contents of said registers for controlling said switching circuit.

4. The computer system of claim 1 further comprising a pair of registers, one of said registers receiving said produced password and the other of said registers containing said predetermined password; and a comparator for comparing the contents of said registers for controlling said switching circuit.

5. In an integrated circuit computer system on a single integrated circuit having a processor interconnected with memory and peripheral circuits on said integrated circuit, a security system comprising:
   a plurality of input ports for said processor;
   a program stored in said memory and operable to control said processor to receive a plurality of commands applied to said plurality of input ports and operable to control said processor to process said commands to produce a password which is compared with a predetermined password.

6. The security system of claim 5 further comprising a switching circuit coupled to a scan-path interface circuit and being responsive to said comparison for switching said scan-path interface circuit between a first mode in which it is enabled and a second mode in which it is disabled.

7. The security system of claim 6 further comprising a pair of registers, one of said registers receiving said produced password and the other of said registers containing said predetermined password; and a comparator for comparing the contents of said registers for controlling said switching circuit.

8. The security system of claim 5 wherein said program operates said processor to receive said plurality of commands which are applied to said plurality of ports in a specific time sequence.

9. The security system of claim 8 further comprising a pair of registers, one of said registers receiving said produced password and the other of said registers containing said predetermined password; and a comparator for comparing the contents of said registers for controlling a switching circuit.

10. The security system of claim 5 further comprising a pair of registers, one of said registers receiving said produced password and the other of said registers containing said predetermined password; and a comparator for comparing the contents of said registers for controlling a switching circuit.

11. A security system for a single chip integrated circuit computer system comprising:
- means on said chip for applying a plurality of commands to a plurality of ports for an on-chip processor of said system;
- a program stored in a memory on said chip coupled to said processor and operable to control said processor to process said plurality of commands to produce a password;
- means on said chip for comparing said produced password with a predetermined password.

12. The security system of claim 11 wherein said program is operable to control said processor to receive said plurality of commands which are applied to said plurality of ports in a specific time sequence.

13. The security system of claim 12 further comprising a pair of registers, one of said registers receiving said produced password and the other of said registers containing said predetermined password; and a comparator for comparing the contents of said registers and generating a comparison signal.

14. The security system of claim 13 further comprising a scan-path interface circuit for reading out contents of a predetermined memory or register in said system and a switching circuit responsive to said comparison to switch operation of said scan-path interface circuit between enabled and a disable modes.

15. The security system of claim 12 further comprising a scan-path interface circuit for reading out contents of a predetermined memory or register in said system and a switching circuit responsive to said comparison to switch operation of said scan-path interface circuit-between enabled and a disable modes.

16. The security system of claim 11 further comprising a pair of registers, one of said registers receiving said produced password and the other of said registers containing said predetermined password; and a comparator for comparing the contents of said registers and generating a comparison signal.

17. The security system of claim 16 further comprising a scan-path interface circuit for reading out contents of a predetermined memory or register in said system and a switching circuit responsive to said comparison to switch operation of said scan-path interface circuit between enabled and a disable modes.

18. The security system of claim 11 further comprising a scan-path interface circuit for reading out contents of a predetermined memory or register in said system and a switching circuit responsive to said comparison to switch operation of said scan-path interface circuit between enabled and disabled modes.

\* \* \* \* \*